Sept. 27, 1949.  F. S. HOWARD  2,482,776
GATE STRUCTURE FOR DISINTEGRATORS
Filed Jan. 6, 1945  2 Sheets-Sheet 1
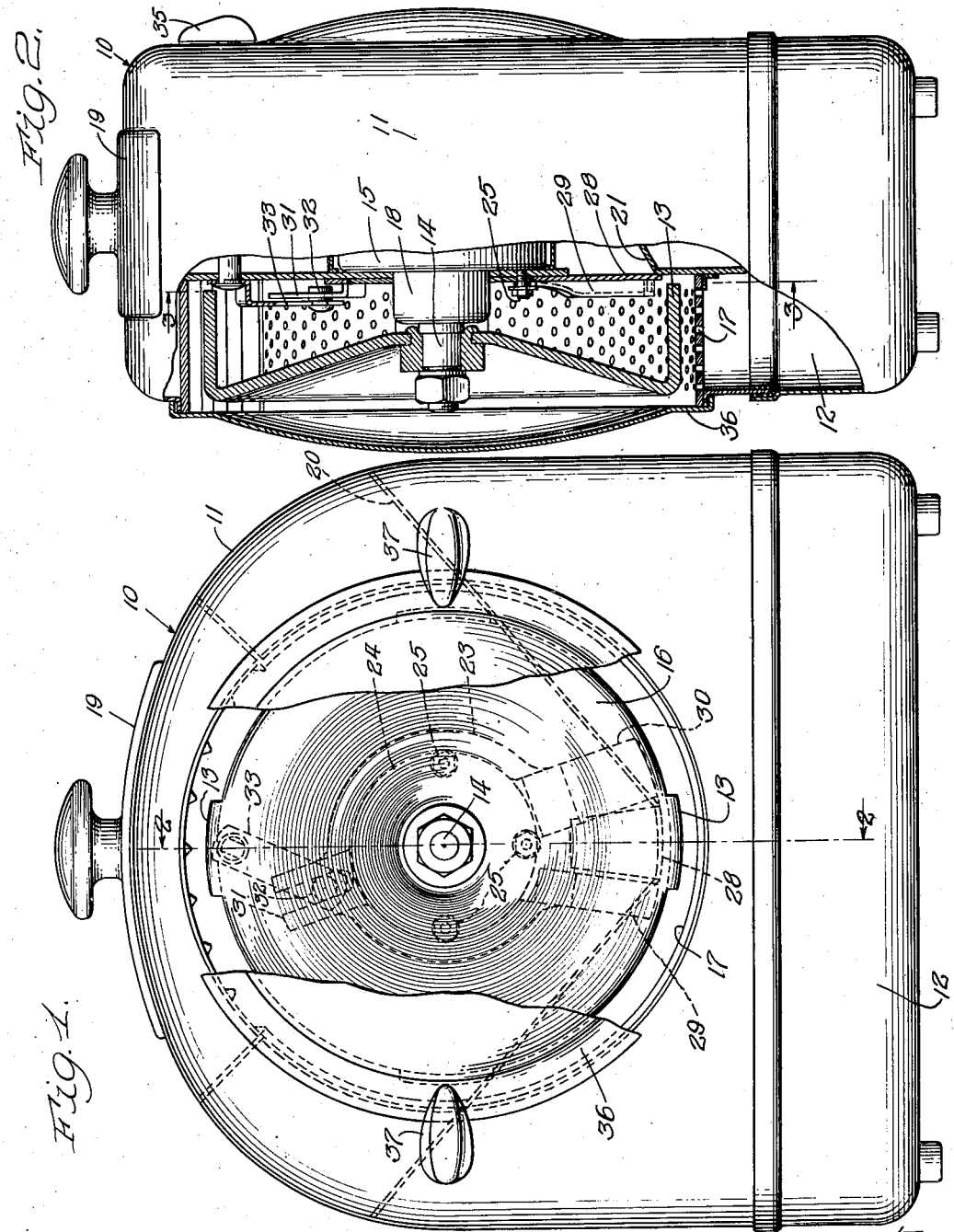

Sept. 27, 1949.                F. S. HOWARD                2,482,776
                        GATE STRUCTURE FOR DISINTEGRATORS
Filed Jan. 6, 1945                                    2 Sheets-Sheet 2
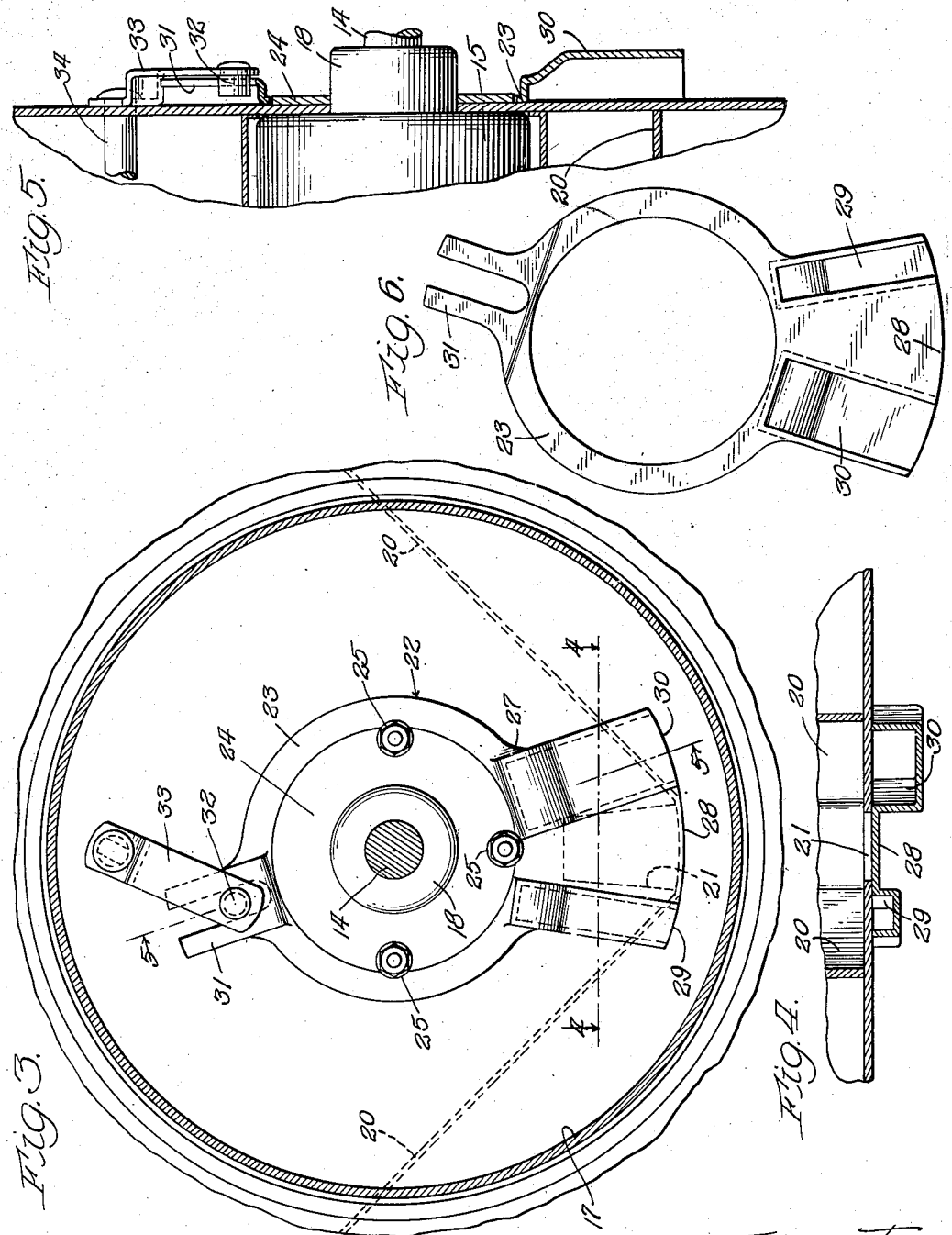

Patented Sept. 27, 1949

2,482,776

UNITED STATES PATENT OFFICE 2,482,776

GATE STRUCTURE FOR DISINTEGRATORS

Frank S. Howard, Chicago, Ill., assignor to Birtman Electric Company

Application January 6, 1945, Serial No. 571,595

13 Claims. (Cl. 241—186)

1

This invention relates to a gate structure for a disintegrator, or the like, for controlling the feed of material to the disintegrating chamber to be ground.

In the ordinary disintegrator, where material such as grain is fed into a disintegrating chamber, there is usually provided a hopper for holding the grain and a chute or other opening leading from the hopper into the disintegrating chamber. There is also ordinarily a gate positioned across the chute to regulate the amount of grain or other material flowing into the disintegrating chamber. This gate usually is only a flat plate positioned across the opening leading from the hopper and the feed is controlled by opening the gate to various widths. It has been found, however, that such a gate is quite inefficient as it does not give the accurate control of feed necessary for most efficient operation of the disintegrator. Where the width of the gate is the only restricting factor in limiting the flow of grain to the disintegrating chamber, the rate of feed has been found to vary and be erratic. This erratic flow of grain is caused by the grain piling up behind the opening, releasing only small amounts, and then suddenly becoming loose and spurting out a relatively huge quantity. Such an erratic flow causes the disintegrator to be alternately under-loaded and over-loaded. This condition is more serious with material of large particle size than it is with material of relatively small particle size. The invention herein described has been found to give a more even flow of grain, or other material to be ground, and to provide a steady flow under all conditions. The invention will be described particularly in connection with a disintegrator such as is shown in co-pending applications Serial Nos. 503,754 and 502,755 filed August 17, 1943, which respectively matured into U. S. Patents 2,355,156 of August 8, 1944, and 2,477,627 of August 2, 1949.

The invention will be described as illustrated in the embodiment shown in the accompanying drawings. Of the drawings, Figure 1 is an elevation partially in section of a disintegrator; Figure 2 is a partial section taken along line 2—2 of Figure 1; Figure 3 is a section taken along line 3—3 of Figure 2; Figure 4 is a section taken along line 4—4 of Figure 3; Figure 5 is a section taken along line 5—5 of Figure 3; and Figure 6 is a rear elevation of the gate structure of this invention.

The disintegrator comprises a housing 10 consisting of a top housing 11 and a bottom 12. Disintegration is accomplished by the rotor hammer 13 rotated on the shaft 14 by a motor 15 at an extremely high rate of speed. The rotor hammer is within a disintegrator chamber 16 that is closed by a lid 36 held in place by clamps 37, and a screen 17 is mounted in the chamber about the path of the rotor hammer 13. The motor 15 which revolves the hammer has a bearing case 18 extending into the disintegrating chamber 16. On top of the disintegrator there is a cover 19 through which grain may be introduced into the hopper 20. From the hopper the grain is fed into the disintegrating chamber through an inclined chute 21. In order to control the flow of grain through the chute there is positioned at its exit the gate structure 22 which is the principal subject of this invention.

The gate structure 22 for regulating the flow of grain or other material comprises an annular ring 23 positioned around the bearing case 18 for the motor and concentric thereto. This ring is held in position by means of a flat disc 24 which is concentric to the ring and in substantially the same plane. The annular ring is designed to slide back and forth in an arc around the margin of the disc 24. In order to hold the ring 23 and disc 24 in planar relationship, there are provided retaining nuts 25 attached to bolts 26 passing through the disc and the disintegrator housing. The annular ring 23 is held in slidable position behind these nuts.

The chute outlet engaging portion 27 of the gate structure is mounted on the bottom of the annular ring 23 and includes a flat section 28 for positioning across the chute 21 when it is desired to stop all flow of grain (Figure 3). On either side of the flat section 28 there are located raised sections 29, 30 having closed sides and top, but being open at the bottom to permit the free fall of the grain. One of the raised sections 29 is of relatively small size to provide slow feed to the disintegrator. The other raised section 30 is of larger size to provide for a more rapid feeding. When one of these raised sections is moved into position against the feed chute, it serves as an extension to the chute. As the bottom of each section is open the grain can thus fall vertically in a free stream onto the revolving hammer 13. Thus the flow is even and uniform at all times. Although in the embodiment shown in the drawings there are only two of the raised sections provided, there can, of course, be practically any desired number, and when all are of different sizes it is possible to provide for several different feeding rates.

In order to provide means for positioning the desired section of the gate structure opposite the exit of the chute, there is located at the top of the gate structure a U-shaped extension 31 projecting away from the annular ring 23. Within this U-shaped extension there is located a bolt 32 slidably mounted therein. This bolt is locked to an arm 33 which is pivoted at its other end on a pivot bar 34. The pivot bar extends through the disintegrator housing and has a handle 35 attached to it at the rear of the housing. When the gate structure is in the position shown in Figure 1 the flat section 28 is positioned across the chute and no grain can flow. If it is desired to then move the large raised section 30 of the gate structure into engaging position, the handle 35 at the rear of the disintegrator is moved to the right (viewed from the rear of the housing). This movement is continued until the large raised section 30 is brought into engaging position. Then the grain flows into the disintegrating chamber through the chute in a rapid but quite uniform stream as the grain is falling vertically in a free stream onto the revolving hammers 13. If it is desired to remove the chute engaging sections completely away from the chute so as to provide a completely unrestricted flow of grain the handle is turned all the way to the right. If, however, it is desired to slow up the rate of feed of the grain, the handle is turned to the left until the small section 29 of the gate is brought into position.

Having described my invention in considerable detail as related to one embodiment of the same, it is my intention that the invention be not limited to these details, unless otherwise specified, but rather be construed broadly within its spirit and scope as set out in the accompanying claims.

I claim:

1. In a disintegrator or the like for grinding material such as grain and including blades adapted to be revolved at high speed and a chute having an outlet at a point above substantially the lowermost point in the path of travel of the blades, a gate structure for regulating flow of grain to the blades, said gate structure comprising a movable plate arranged in front of said outlet and comprising a flat portion for closing the outlet and at least one raised portion having an open bottom for permitting the grain to fall substantially vertically in a continuously flowing free stream onto the revolving blades from said hopper when said raised portion is in fixed position in front of said outlet.

2. In a disintegrator or the like for grinding material such as grain and including blades adapted to be revolved at high speed and a chute having an outlet at a point above substantially the lowermost point in the path of travel of the blades, a gate structure for regulating flow of grain to the blades, said gate structure comprising a movable plate arranged in front of said outlet and comprising a flat portion for closing the outlet and at least one raised portion forming, when in feeding position, an extension to said chute and being closed at sides and top but being open at the bottom for permitting the grain to fall substantially vertically from the open bottom in a continuously flowing free stream onto the revolving blades.

3. In a disintegrator or the like for grinding material such as grain and including blades adapted to be revolved at high speed and a chute having an outlet at a point above substantially the lowermost point in the path of travel of the blades, a gate structure for regulating flow of grain to the blades, said gate structure comprising a movable plate arranged in front of said outlet and comprising a flat portion for closing the outlet and a plurality of raised portions each forming, when in feeding position, an extension to said chute and each being closed at the sides and top but being open at the bottom for permitting the grain to fall substantially vertically from the open bottom in a continuously flowing free stream onto the revolving blades, each of said raised portions being a different size for providing a variety of rates of feeding when a portion is in a fixed position over said outlet, and means for moving the movable plate from position to position.

4. A gate structure for a disintegrator or the like as set out in claim 3 wherein the movable plate is pivoted at a point above the outlet-engaging portions of said plate so that it can be swung from position to position in pendulum fashion when changing the rate of flow.

5. A disintegrator comprising a horizontal shaft, a disintegrator rotor on said shaft provided with a series of peripheral disintegrator blades adapted to revolve at high speed in one annular area, a hopper for storing grain or the like, a chute leading from the hopper to a point above the annular area of rotation of the blades but beneath the shaft, and a gate structure for regulating flow of grain through the chute, said gate structure comprising a movable plate arranged in front of the outlet of said chute and comprising a flat portion for closing said outlet and at least one raised portion having an open bottom for permitting the grain to fall vertically in a continuously flowing free stream onto the revolving blades.

6. A disintegrator comprising a horizontal shaft, a disintegrator rotor on said shaft provided with a series of peripheral disintegrator blades adapted to revolve at high speed in one annular area, a hopper for storing grain or the like, a chute leading from the hopper to a point above the annular area of rotation of the blades but beneath the shaft, and a gate structure for regulating flow of grain through the chute, said gate structure comprising a movable plate arranged in front of said outlet and comprising a flat portion for closing the outlet and at least one raised portion forming, when in feeding position, an extension to said chute and being closed at sides and top but being open at the bottom for permitting the grain to fall substantially vertically from the open bottom in a continuous flowing free stream onto the revolving blades.

7. A disintegrator comprising a horizontal shaft, a disintegrator rotor on said shaft provided with a series of peripheral disintegrator blades adapted to revolve at high speed in one annular area, a hopper for storing grain or the like, a chute leading from the hopper to a point above the annular area of rotation of the blades but beneath the shaft, and a gate structure for regulating the flow of grain through the chute, said gate structure comprising a movable plate arranged in front of said outlet, and comprising a flat portion for closing the outlet and a plurality of raised portions each forming, when in feeding position, an extension to said chute and each being closed at the sides and top but open at the bottom for permitting the grain to fall substantially vertically from the open bottom in a continuously flowing free stream onto the revolving blades, each of said raised portions being a different size for providing a variety of rates of feeding and means for moving the movable plate from position to position.

8. A gate structure for a disintegrator or the like as set out in claim 7 wherein the movable plate is pivoted at a point above the outlet-engaging portions of said plate so that it can be swung from position to position in pendulum fashion.

9. A disintegrator comprising a horizontal shaft, a disintegrator rotor on said shaft provided with a series of peripheral disintegrator blades adapted to revolve at high speed in one annular area, a hopper for storing grain or the like, a chute leading from the hopper to a point above a lower portion of the annular area of rotation of the blades but beneath the shaft, and a gate structure for regulating flow of grain through the chute, said gate structure comprising a vertical portion pivotally mounted around the shaft and a chute outlet engaging portion having a flat section for closing off the chute outlet and at least one raised section so constructed and arranged as to engage the chute outlet and permit the grain to fall vertically in a continuously flowing free stream onto the revolving blades, and means for moving the gate structure around its pivot to bring any of the various sections into chute outlet engaging position.

10. A disintegrator comprising a horizontal shaft, a disintegrator rotor on said shaft provided with a series of peripheral disintegrator blades adapted to revolve at high speed in one annular area, a hopper for storing grain or the like, a chute leading from the hopper to a point above a lower portion of the annular area of rotation of the blades but beneath the shaft, and a gate structure for regulating flow of grain through the chute, said gate structure comprising a vertical portion pivotally mounted around the shaft and a chute outlet engaging portion having a flat section for closing off the chute outlet and a plurality of differently sized raised sections each closed at sides and top but open at the bottom to form an extension to the chute and permit the grain to fall from the open bottom vertically in a free stream onto the revolving blades, and means on another section of the vertical portion of the gate structure for moving said structure around its pivot to bring any desired section into chute outlet engaging position and to move all other sections out of engaging position so as to permit unrestricted and continuous flow of grain through said chute.

11. A disintegrator comprising a horizontal shaft, a disintegrator rotor on said shaft provided with a series of peripheral disintegrator blades adapted to revolve at high speed in one annular area within a disintegrating chamber a motor attached to said shaft for causing rotation therein with a section of the motor extending into the disintegrating chamber, a hopper for storing grain or the like, a chute leading from the hopper to a point above the lower portion of the annular area of rotation of the blades but beneath the shaft, and a gate structure for regulating flow of grain through the chute, said gate structure comprising a vertical portion pivotally mounted around the portion of the motor extending into the disintegrating chamber and a chute outlet engaging portion having a flat section for closing off the chute and a plurality of differently sized raised sections each closed at sides and top but open at the bottom to form an extension to the chute and to permit the grain to fall from the open bottom vertically in a free stream onto the revolving blades, and means on the gate structure above the pivot for moving said structure around said pivot to bring any desired section into chute outlet engaging position and to move all sections out of engaging position so as to permit unrestricted flow of grain through said chute.

12. A disintegrator as set out in claim 11 wherein said vertical portion comprises an annular ring slidably mounted around said portion of the motor extending into the disintegrating chamber.

13. A disintegrator as set out in claim 11 wherein said vertical portion comprises an annular ring slidably mounted on, and concentric to, a flat disc provided around the said section of the motor extending into the disintegrating chamber.

FRANK S. HOWARD.

REFERENCES CITED

The following references are of record in the file of this patent:

UNITED STATES PATENTS

| Number | Name | Date |
|---|---|---|
| 468,870 | Griswold | Feb. 16, 1892 |
| 711,688 | Williams | Oct. 21, 1902 |
| 795,133 | Johnson | July 18, 1905 |
| 1,331,969 | Tomlinson | Feb. 24, 1920 |
| 1,573,040 | Crites | Feb. 16, 1926 |
| 1,646,720 | Andrews | Oct. 25, 1927 |
| 1,700,738 | Kier | Feb. 5, 1929 |
| 1,748,050 | Harrington | Feb. 8, 1930 |
| 1,765,309 | O'Neill | June 17, 1930 |
| 1,786,262 | Poppelman | Dec. 23, 1930 |
| 1,962,778 | Kranick | June 12, 1934 |
| 2,033,256 | Schacher | Mar. 10, 1936 |
| 2,166,351 | Hagen | July 18, 1939 |

FOREIGN PATENTS

| Number | Country | Date |
|---|---|---|
| 193,793 | Great Britain | Mar. 1, 1923 |
| 300,879 | Great Britain | Nov. 22, 1928 |
| 687,872 | France | May 5, 1930 |